UNITED STATES PATENT OFFICE.

GEORGE D. FEIDT, OF PHILADELPHIA, PENNSYLVANIA, ASSIGNOR, BY MESNE ASSIGNMENTS, TO AMERICAN CHEMICAL PAINT COMPANY, OF PHILADELPHIA, PENNSYLVANIA, A CORPORATION OF DELAWARE.

METHOD OF PREPARING STEEL FOR PAINTING.

1,109,670.  Specification of Letters Patent.  Patented Sept. 8, 1914.

No Drawing.  Application filed February 4, 1914.  Serial No. 816,537.

*To all whom it may concern:*

Be it known that I, GEORGE D. FEIDT, a citizen of the United States, and a resident of Philadelphia, in the county of Philadelphia and State of Pennsylvania, have invented a certain new and useful Method of Preparing Steel for Painting, of which the following is a specification.

The object of this invention is to prevent the rusting of steel beneath the priming coat of paint.

The invention may be used to advantage on any steel articles, yet it is especially suited to that class of goods manufactured from thin sheet steel. Articles manufactured from sheet steel would be highly satisfactory were it not for the tendency steel has to corrode or rust, which not only destroys the high finish applied to these articles but finally destroys the whole body itself.

In its ordinary condition, iron (or steel) is unaffected by perfectly dry air, but in the presence of moisture and carbonic acid gas it is gradually converted into hydrated ferric oxid ($2Fe_2O_3.3H_2O$) or rust. The water is decomposed and ferrous carbonate formed ($Fe+H_2O+CO_2=FeCO_3+H_2$); this is dissolved by the carbonic acid present and the solution rapidly absorbs oxygen from the air, depositing the ferric oxid in a hydrated state, $2FeCO_3+O=Fe_2O_3+2CO_2$. Similar reactions take place substituting hydrochloric acid for the carbonic acid and in fact by even substituting many of the salts of hydrochloric acid or other acids; hence it is that soldering solutions (which are chlorides) and the moisture from the hands, which is perspiration and contains sodium chloride, easily cause the rusting of steel.

Steel can be protected from oxygen water and carbonic acid gas by a covering of paint and as long as the paint is in good condition it will not rust, but it is clear that if the surface of the steel is exposed to moisture, perspiration or soldering fluids before the paint is applied, rusting is apt to develop under the paint. As rust itself is a rather porous body and is hydroscopic, it is not advisable to allow it to be on the surface of the steel when it is painted as it is likely to increase. In order to prevent these defects and disadvantages it has been proposed to use many aqueous solutions of phosphoric acid, but as it is difficult to dry out such solutions, the steel often remains damp in certain spots which finally result in rusting at these places. Furthermore, all oil and grease must be removed from the surfaces before using an aqueous solution, as otherwise the solution will not act on the surface, not being capable of dissolving the oil, and it is difficult to remove all traces of oil and grease without using chemicals which in themselves are obnoxious. Paint applied to a steel surface after having been treated by such a process usually becomes defective in time due to the imperfect action of the solution, due to the oil and the like, or due to a chemical action on the paint by some of the chemicals used which are retained on the surface of the steel.

Generally stated the present invention consists in applying a fluid admixture of alcohol and phosphoric acid to the steel which acts, not only on the steel itself producing a clean bright surface, but also acts on any foreign matter such as rust, oil, grease, soldering fluids, perspiration and the like, changing them into harmless bodies which are dissolved by the solutions and are carried away with the solution when the surface is dried as by wiping it with a cloth.

The process has the following advantages: It can be applied to any steel article, no matter how large or small; it can be applied to hollow steel structures having a filling of cork, or the like; it is a cold process and will not melt solder or cause buckling; after application the steel does not have to be painted for many days; the steel will stand considerable handling before painting; it enters all cracks and crevices; it requires no tanks or special machinery, and can be employed by unskilled labor at comparatively little expense.

Although several different chemical solutions can be used for the purpose the most practical known to me at the present time is an alcoholic solution of ethyl phosphate. This is made by dissolving orthophosphoric acid, as free from water as possible, in ethyl alcohol, in such proportions that there will be an excess of free alcohol. Orthophosphoric acid will not of itself, act on an oily surface nor will it act if the surface is first washed with ethyl alcohol and dried, but when the alcohol and the acid are combined the compound of the two will act on an oily surface. This is undoubtedly due to the fact that the ethyl phosphate formed by the combination has distinctive properties of its own.

The application of the solution is preferably made with a brush, the operation being similar to that of painting. There is no objection however to dipping the article into a bath of the solution when it is convenient to do so.

A suitable strength for the solution will be found to be orthophosphoric acid, one part by volume, (85% solution) and alcohol, two parts by volume. The result of this is the formation of an alcohol phosphate dissolved in the excess of alcohol.

The process as applied to sheet steel work, such as interior finish, automobile bodies, etc., is as follows: The article is painted with an alcoholic solution of orthophosphoric acid. In cases where there is much rust incrusted on the surface of the steel the action of the acid is assisted by rubbing the rusty spot with emery cloth, care being taken to keep the spot wet with the solution. A period of from one to three minutes is now allowed for the solution to act. The steel is then wiped dry with a cloth or waste. It is now ready for painting. Painted samples have been exposed to the weather for several years and have not yet rusted under the paint.

What I claim is:

1. The method of preparing steel for painting which consists in treating it with an alcohol phosphate dissolved in alcohol.

2. The method of preparing steel for painting which consists in treating it with an admixture of alcohol and phosphoric acid, which will dissolve oil and act on the steel.

3. The method of preparing steel for painting which consists in applying an alcoholic solution of orthophosphoric acid.

4. The method of preparing steel for painting which consists in applying an admixture of alcohol and phosphoric acid which will dissolve oil and chemically act on the steel, and rubbing it with an abrasive while it is still wet with the solution.

5. The method of preparing steel for painting which consists in applying an admixture of alcohol and phosphoric acid which will dissolve oil and chemically act on the steel, rubbing it with an abrasive while it is still wet with the solution, and finally wiping away all products of the action of the solution.

In testimony whereof I have hereunto signed my name.

GEORGE D. FEIDT.

Witnesses:
 WM. REEVER,
 EDNA SCHAUFFELE.